UNITED STATES PATENT OFFICE.

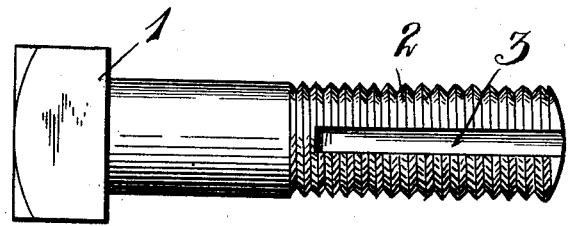
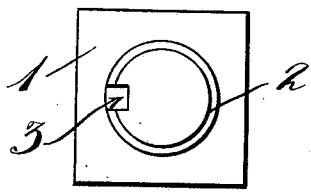
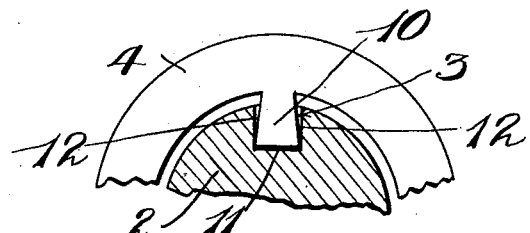
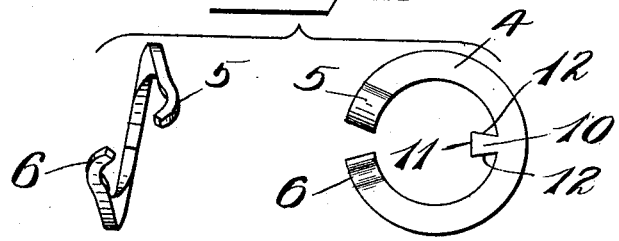
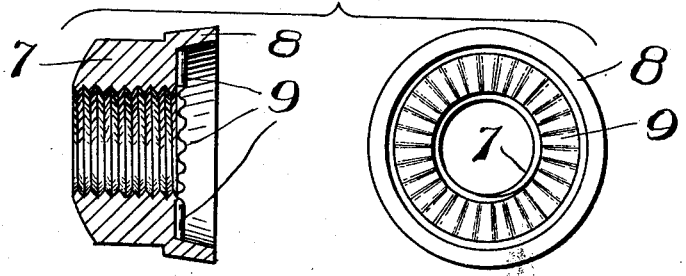

JOHN R. ARMSTRONG, OF CRANSTON, RHODE ISLAND.

NUT-LOCK CONSTRUCTION.

1,088,253. Specification of Letters Patent. Patented Feb. 24, 1914.

Application filed June 19, 1913. Serial No. 774,577.

*To all whom it may concern:*

Be it known that I, JOHN R. ARMSTRONG, a citizen of the United States, residing at Cranston, Providence county, State of Rhode Island, have invented certain new and useful Improvements in Nut-Lock Construction, of which the following is a full, clear, and exact description.

This invention relates to an improvement in the construction of nut locks of the type employing in conjunction with a bolt and a coöperating nut, a washer guided on the bolt against rotation and coöperating with the nut.

Specifically, the present invention has relation to such a washer when used in conjunction with a bolt having a slot extending longitudinally of its shank in which a projection from the washer member seats to prevent the rotation of the washer on the bolt. This retaining projection on the washer, in practice, is of substantially less width than the width of the slot in the bolt, so that there is bound to be a slight movement of the washer relative to and circumferentially of the bolt shank. This, in the past, has resulted in the engagement of the edge of the washer projection with the threads of the bolt shank at the edge of the slot therein, which engagement, jams the washer on the bolt shank and prevents the proper operation of the nut.

The present invention aims to provide a structure which will prevent such jamming, and is described in detail in the following specification taken in connection with the accompanying drawing forming part thereof and illustrating such a preferable embodiment of the invention.

In these drawings, Figure 1 is a view in elevation of a bolt having a longitudinal slot in its threaded shank. Fig. 2 is an end view of said bolt. Fig. 3 illustrates in end and side elevation, a washer member which coöperates with the slotted bolt shank and embodies the jam-preventing means of the present invention. Fig. 4 is a view in transverse section and end elevation of a cupped nut coöperating with this washer. Fig. 5 is a fragmentary view on an enlarged scale showing the coöperation of the washer with the slotted bolt shank.

Referring to the drawings by numerals, 1 indicates the head of a bolt of conventional design having the threaded shank 2 provided with the slot 3 extending longitudinally thereof.

4 designates a washer member, in the present instance, and for the purposes of illustration a spiral spring washer, designed to move longitudinally the bolt shank and having its ends provided with oppositely facing projections 5 and 6 forming pawl members. It will be understood, of course, that the bolt is inserted through such parts as are to be fastened together, and this washer member moved up on the bolt shank to bring one end to bear against the parts to be fastened. A nut 7, which may be of the "cupped" type, coöperates with this washer, said nut being provided at its inner face with an annular flange 8 providing the cupped portion and with an annular series of corrugations 9 within the cupped portion and exteriorly of and concentric with the threaded bore of the nut, these corrugations forming a ratchet surface and coöperating with the outermost end of the washer member 4 to engage its pawl and compress the spiral washer sufficiently to lock the lock on the bolt.

The slot 3 on the bolt shank, is ordinarily formed with its side walls at right angles to the base of its channel. Washers as heretofore constructed have been provided with lugs extending inwardly from their inner edges and of a shape corresponding with the shape of slot 3 in cross section, but of substantially less size to enable the washer to slide freely and longitudinally of the slot, as the nut is screwed up to engage the pawl of the washer and lock the parts together. This prior construction of guiding lug has provided a clearance between the lower end of the lug and the side walls of the slot. This clearance enables a slight rotation of the washer on the bolt shank, and this rotation in practice has caused the upper edges of the lug to ride in between the threads at the edge of the slot, causing the washer to jam between the threads and preventing further inward clamping movement of the nut on the bolt.

Under practical working conditions the lug which extends from the washer into the bolt slot must of necessity be of substantially less width than the width of said slot. This slight relative rotatory movement of the washer on the bolt will, therefore, always be possible under practical working conditions.

I have, however, so constructed the guiding lug of the washer as to prevent any jamming engagement thereof with the bolt threads, when such a movement takes place, and it will be obvious that such rotatory movement usually does take place owing to the frictional engagement of the rotating nut with the washer when being screwed up. To this end I preferably provide a washer lug 10, integral with the washer 4 and at its inner extremity 11 of a width less than the width of the bolt slot at such point, so as to enable the washer to move freely and longitudinally of the slot. Instead, however, of making the width of this lug uniform from its inner to its outer extremity, I bevel or incline the sides 12 thereof inwardly, to provide a lug of substantially less width adjacent the periphery of the bolt. This may be done by beveling as shown, or by any suitable line of cut which will provide the less width above referred to. The lug, therefore, will be of maximum width at its base or inner extremity, and of substantially less width adjacent the threaded periphery of the bolt shank. With a washer provided with a lug such as described, it will be evident that because of the substantially diminished width of the lug adjacent the threaded periphery of the bolt shank, entry of the edges of said lug between the threads of the bolt upon slight rotatory movement of the washer is impossible. (See particularly Fig 5). The decrease in width of the lug will, of course, be figured to be substantially greater than the maximum amount of rotatory movement permitted by reason of the loose engagement of the base or the inner extremity of the lug, with the side walls of the bolt slot.

As I have before stated, the lug may assume different shapes providing a substantial difference in width between its inner and outer ends, and need not assume the specific shapes shown in the drawings. The decreased width of the lug at the point adjacent the threaded periphery of the bolt shank may be uniform or at equal distances in opposite directions from the center line of the lug, so that a clearance shall be provided between the edges of the lug and bolt threads in either direction of rotation of the washer on the bolt. This will make the improved construction of washer lug efficacious when the washer is double ended as in the present showing and is put on with either face outermost. Furthermore, while I have shown this lug as applied to a spiral spring washer, it may be used in conjunction with various forms of washers, and is not limited by any means to use in conjunction with the specific form of nut and spiral spring washer shown in the drawings. These forms have, of course, only been shown as illustrating a standard construction of nut lock to which the subject matter of the present invention is applicable.

What I claim, therefore, and desire to secure by Letters Patent is:

1. In a device of the character described, in combination, a bolt having a slot therein extending longitudinally of its threaded shank and of substantially uniform width, a nut coöperating with said threaded shank, and a washer member provided with a lug extending therefrom and seating in said slot, the extremity of said lug being of less width than the width of said slot at such point, and of substantially greater width than that portion of the lug adjacent the threaded periphery of the bolt shank.

2. In a device of the character described, in combination, a bolt having a slot extending longitudinally of its threaded shank, a washer member apertured to fit over said bolt shank and having a lug extending into said shank slot to a point adjacent its bottom, said lug being of a contour different from that of said slot and having its lower end of a width somewhat less than the width of said slot adjacent its bottom and near its upper end adjacent the threaded peripheral edge of the shank, being shaped to provide substantial clearance between its edges and the threaded peripheral shank edges bordering said slot, and a nut coöperating with said bolt shank and washer.

JOHN R. ARMSTRONG.

Witnesses:
HENDERSON T. HILL,
E. E. MORSE.

---

Copies of this patent may be obtained for five cents each, by addressing the "Commissioner of Patents, Washington, D. C."